United States Patent [19]

Story et al.

[11] Patent Number: 5,042,904
[45] Date of Patent: Aug. 27, 1991

[54] COMMUNICATIONS CABLE AND METHOD HAVING A TALK PATH IN AN ENHANCED CABLE JACKET

[75] Inventors: Christopher A. Story; Paul A. Wilson, both of Hickory, N.C.

[73] Assignee: Comm/Scope, Inc., Hickory, N.C.

[21] Appl. No.: 555,160

[22] Filed: Jul. 18, 1990

[51] Int. Cl.⁵ .......................... G02B 6/44; H02G 3/00
[52] U.S. Cl. .................... 385/105; 385/110; 174/70 R; 174/72 R; 174/107; 174/110 PM; 174/23 R
[58] Field of Search ............... 350/96.23, 96.30, 96.33, 350/320; 174/70 R, 72 R, 72 C, 22 R, 23 R, 88 R, 107, 110 PM

[56] References Cited

U.S. PATENT DOCUMENTS

| | | | |
|---|---|---|---|
| 1,157,208 | 10/1915 | Conrad | 174/72 R X |
| 3,660,590 | 5/1972 | Conant | 174/47 |
| 3,748,371 | 7/1973 | Krook et al. | 174/70 R |
| 3,812,282 | 5/1974 | Johansson | 174/70 R |
| 4,038,489 | 7/1977 | Stenson et al. | 174/70 R |
| 4,237,337 | 12/1980 | Serrander | 174/70 R |
| 4,365,865 | 12/1982 | Stiles | 350/96.23 |
| 4,552,432 | 11/1985 | Anderson et al. | 350/96.23 |
| 4,654,520 | 3/1987 | Griffiths | 350/96.23 X |
| 4,695,127 | 9/1987 | Ohlhaber et al. | 350/96.23 |
| 4,695,128 | 9/1987 | Zimmerman et al. | 350/96.23 |
| 4,731,505 | 4/1988 | Crenshaw et al. | 174/107 |
| 4,787,705 | 11/1988 | Shinmoto et al. | 350/96.23 |
| 4,805,981 | 2/1989 | Gould | 350/96.23 |
| 4,812,014 | 3/1989 | Sawano et al. | 350/96.23 X |
| 4,844,575 | 4/1989 | Kinard et al. | 350/96.23 |
| 4,859,024 | 8/1989 | Rahman | 350/96.23 |
| 4,890,898 | 2/1990 | Bentley et al. | 350/96.23 |
| 4,952,020 | 8/1990 | Huber | 350/96.23 |

Primary Examiner—Brian Healy
Attorney, Agent, or Firm—Bell, Seltzer, Park & Gibson

[57] ABSTRACT

A method and apparatus for providing a talk path in a longitudinal cavity of an enhanced crush, impact, and cut-through resistant communications cable. The talk path is especially suited for a fiber optic communications cable. The cable jacket is formed of a deformable material having a plurality of longitudinal cavities spaced about the cable core. A longitudinal cavity may contain a copper pair or optical fiber to serve as a talk path during servicing of the cable. The talk path may be readily accessed by a service technician without exposing the inner core or the communications cable.

28 Claims, 2 Drawing Sheets

COMMUNICATIONS CABLE AND METHOD HAVING A TALK PATH IN AN ENHANCED CABLE JACKET

FIELD OF THE INVENTION

This invention relates to a communications cable containing a talk path to be used by field service technicians and, more particularly, to a communications cable with a talk path positioned in a longitudinal cavity of an enhanced crush, impact, and cut-through resistant cable jacket.

BACKGROUND OF THE INVENTION

Fiber optic, coaxial, and copper pair cables are widely used in the telecommunications industry. High pair count copper cables, containing individual twisted pairs of conductors, are frequently used as feeder cables between telephone customers and the telephone company central office. Broadband coaxial cables are often found in cable television (CATV) systems. Modern fiber optic cables, in particular, have revolutionized the long distance telecommunications industry in the United States and many other countries. Fiber optic cables are also penetrating into local telephone markets and CATV markets, displacing these older technologies.

Fiber optic cables offer numerous advantages over prior technology. For example, a fiber optic cable may provide an unrepeatered distance of 50 miles or more with currently available electronics. Fiber optic cables may transport digital light pulses for essentially noise-free communications transmission of vast quantities of information. The fibers, when used to transmit information in an analog signal form, offer wide signal bandwidths. Fiber optic cables have immunity to crosstalk and electromagnetic interference because of the dielectric composition of the individual fibers, and the cable itself may be made relatively light in weight and small in diameter, thereby substantially reducing installation costs.

One disadvantage of a fiber optic cable is that it often requires precise alignment of the individual fibers for joining cable segments by "fusion" splicing or mechanical connectors. Since the light carrying core of an individual fiber may typically be as small as 8 microns, precise tolerances must be observed when positioning the fiber for splicing. In addition, each splice is routinely acceptance tested to assure a proper splice. These splices, if not correctly performed, may cause unacceptable losses in the overall fiber optic system. Therefore, a field communication link between separated service technicians is typically desired to assist in alignment of the fibers during splicing operations and to verify proper splices.

Because of the large traffic carrying capacity of fiber optic cables, prompt service restoration by the splicing of damaged cable sections is often an economic necessity. Frequently, field service technicians need to communicate from a remote cable location to another remote location or to an equipment termination point or system repeater site. Unfortunately, the long unrepeatered distances available with fiber optic cable further complicates the problem of establishing field communications links. Access to the public switched telephone network is often not available at a remote site. Mobile radios may be used for field communication; however, radio frequencies are limited and radio equipment may be expensive and unreliable.

To assist field service technicians, the art has developed a method of providing a communications link between the technicians along the cable route by placing a copper "talk pair" in the fiber optic cable. A cable which has a core incorporating several buffer tubes, each containing one or more optical fibers, may have the talk pair placed in a spare buffer tube. An alternative approach is to place the talk pair directly in the extruded plastic jacket, as taught in U.S. Pat. No. 4,844,575 to Kinard et al. Both of these cable designs require that the inner fiber optic core of the cable be exposed to access the talk pair. To avoid severing the core, great care must be exercised when attempting to access the talk pair. For service restoration where only a few of the many individual fibers in the cable are damaged, an accidental or intentional severing of the cable core will disrupt working fibers; therefore, an attempt to access the talk pair may be undesirable.

A further disadvantage for optical fibers is that they require protection from external stretching, bending, and crushing forces. A failure to adequately protect the individual fibers may result in initial optical losses exceeding a planned system loss budget. Splices may then have to be remade or a costly electronic repeater site may need to be added to the system. Inadequate fiber protection may also cause premature failure of the fibers during their service life.

Optical fiber protection is typically provided by a cable structure which isolates the individual fibers from these potentially damaging external forces. For example, to protect the fibers from stress caused by an applied tension force, a longitudinally extending strength member such as a high tensile strength aramid yarn is frequently incorporated into the cable. To protect the cable from bending, a central rigidity member may be provided in the cable core or a rigid single tube in the core may be provided. Crush, impact, and cut-through resistance are provided by carrying the fibers in a central core and surrounding the core in a protective jacket. To increase the protection provided by the jacket, its thickness may be increased or multiple layers of jacketing may be provided. These modifications to the cable jacket increase the initial cost and weight of the cable while reducing its flexibility. Larger and less flexible cables typically increase labor and handling costs for installation as well.

An enhanced crush, impact, and cut-through resistant cable jacket for aerial coaxial cable is disclosed in U.S. Pat. No. 4,731,505 to Crenshaw et al., the teachings of which are hereby incorporated herein by reference. The jacket consists of a plurality of radially spaced longitudinal cavities each having a non-symmetrical cross-sectional geometry such that a radially applied force will be dissipated rather than transmitted to the cable core.

SUMMARY OF THE INVENTION

With the foregoing background in mind, it is an object of the present invention to provide an improved communications cable with an jacket containing a talk path therein for establishing a field communications link which can be readily accessed without exposing the core of the cable.

It is another object of the invention to provide an improved communications cable which resists crushing, impact, and cut-through forces while retaining flexibility and which includes a talk path therein which can be readily accessed by field service technicians.

These and other objects are provided according to the present invention by a communications cable which has a longitudinally extending core containing the primary communications signal conductors. These primary signal conductors may be one or more optical fibers, copper pairs, or a coaxial arrangement of conductors, among others. The core may include an overwrap of a strength member, such as an aramid yarn, or a steel tape may be applied to protect the cable from rodent damage. The core is surrounded by a protective cable jacket of a deformable, or plastic, material.

The jacket is preferably formed to have longitudinal cavities at radially spaced locations about the core. The cavities preferably have a non-symmetrical cross-section such that under load, a substantial portion of any radially transmitted force will be dissipated. Accordingly, the longitudinal cavities provide enhanced crush, impact, and cut-through resistance to the cable. The cavities may be left open and therefore contain air, or the cavities may be filled with a water blocking compound. The water blocking compound prevents moisture from entering and migrating within the cable. Water may damage a cable by expansion caused by freezing.

A talk path is preferably placed in one or more of the longitudinal cavities. The talk path may be a copper twisted pair, or talk pair, as traditionally used in the telephone industry, or the talk path may be one or more optical fibers of either the loose-buffered or tight-buffered type. The talk path permits field technicians to reliably communicate from distant points along the cable path.

For a twisted copper pair, the field communications link may be established by connecting a field telephone to the talk path at two points along the cable path. The operation of a field telephone is well known to those skilled in the art. For an optical fiber, an optical transceiver, also well known to those skilled in the art, may be connected to the talk path fiber. The optical transceiver provides an electrical to optical conversion in the transmit mode and an optical to electrical conversion in the receive mode.

To assist the field technician in determining the exact location of the talk path within the jacket, a marking, embossing, or extruded striping may preferably be applied to the outer surface area of the cable jacket. The marking is directly over the underlying talk path so that the field technician may remove only that outer portion of the jacket necessary to access the talk path without exposing the cable core. The invention, therefore, overcomes the limitation of the prior art which requires that the cable, including the cable core, be completely severed to access the talk path.

DESCRIPTION OF THE PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiment set forth herein; rather, applicant provides this embodiment so that this disclosure will be thorough and complete, and will fully convey the scope of the invention to those skilled in the art. Like numbers refer to like elements throughout.

Figure 1:
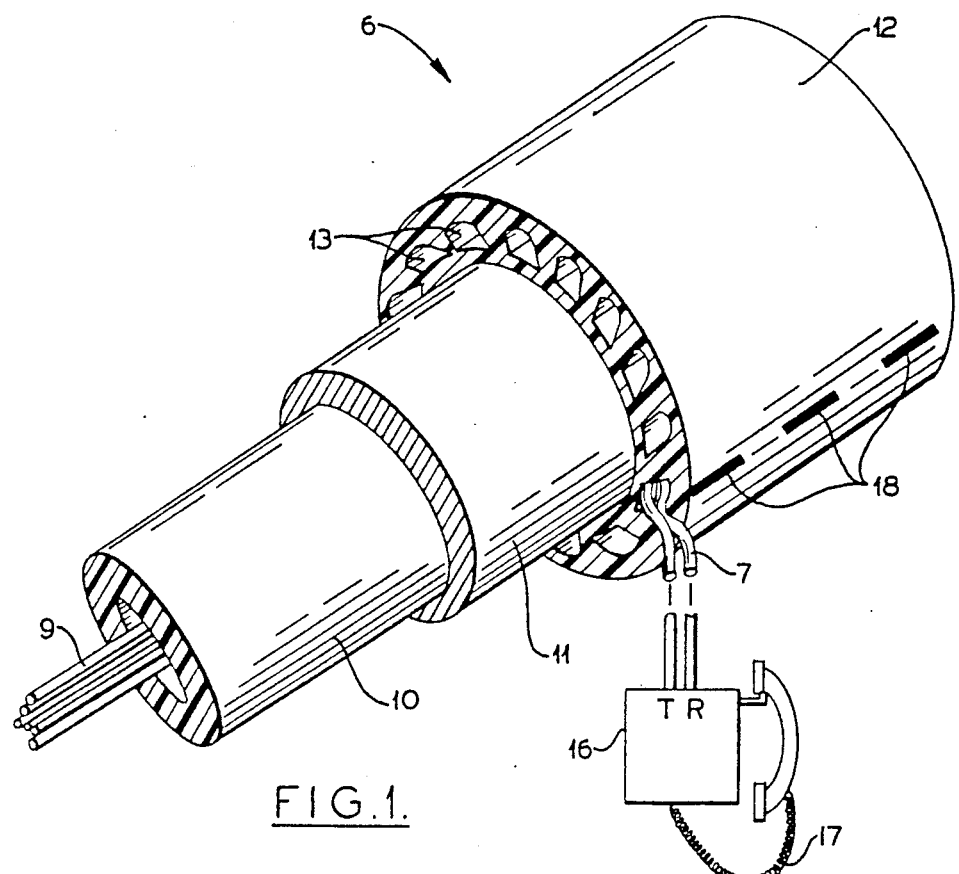
FIG. 1 is a perspective view of a cross-section of a fiber optic cable containing a copper twisted pair talk path according to the present invention.

FIG. 1 is a perspective view of a cross-section of a fiber optic cable 6 containing a talk path consisting of a twisted pair of copper conductors 7, according to the present invention. The primary communications signal conductors, in this case optical fibers 9, are carried within a core 10 comprising a single plastic buffer tube. As would be readily understood by one skilled in the art, the primary signal conductors may also be copper conductors (not shown), or a may be a combination of optical fibers 9 and copper conductors in a hybrid communications cable.

As would also be known to one skilled in the art, the core 10 may comprise multiple buffer tubes, each containing multiple fibers 9, to provide a high fiber count cable 6 in a relatively small diameter. As would also be known to one skilled in the art, the core 10 may also consist of a one or more tight-buffered optical fibers 9 without a separate buffer tube.

The core 10 of a fiber optic cable 6 is typically surrounded by a longitudinal strength member 11. This strength member 11 may be an aramid yarn material, such as Kevlar, in a stranded configuration. The strength member 11 serves to further cushion the core 10 while providing resistance to stretching of the cable 6, especially during installation of the cable 6. It would be readily understood by one skilled in the art that a strength member 11 may be positioned in alternative locations within the cable 6, for example in the center of the cable 6, or eliminated altogether depending upon the desired tensile strength of the cable 6.

The cable jacket 12 may preferably be formed of a deformable material. As one would be understood by one skilled in the art, polyethylene may be a preferred material for outdoor aerial applications, but a wide range of other materials, especially plastics, may also be used for the cable jacket 12. The cable jacket 12 contains longitudinal cavities 13 running continuously along the length of the cable 6.

The longitudinal cavities 13 may contain air or may be filled with a water blocking compound. Water blocking compounds, such as silicone greases for example, are well known in the art to prevent the ingress and migration of moisture in a cable 6. Moisture, if allowed to enter a cable 6, may freeze and cause mechanical damage to the cable 6. In fact, a core 10 carrying the optical fibers 9 may typically contain a water blocking compound also.

The cable jacket 12 may be formed by melting a quantity of thermoplastic material, such as polyethylene, and passing the melted material through an extruder (not shown) to form the longitudinal cavities 13. The extruded material is formed surrounding the cable core 10 and the twisted pair 7 talk path may be simultaneously placed inside one or more of the cavities 13. In a preferred embodiment, marking 18 may then be applied to the cable jacket 12 by any of several techniques well known to those skilled in the art, such as an application of ink contrasting in color to the jacket 12. The marking 18 indicates the position of the underlying twisted pair 7 talk path in the cable jacket 12. In other embodiments, the marking 18 may be made by embossing the cable jacket 12 or by extruding a stripe of plastic distinguishable in color from the jacket 12. The marking 18 allows the technician to readily locate the underlying twisted pair 7 talk path and remove only that part of the outer cable jacket 12 necessary to gain access to the talk path. The core 10 of the cable 6, therefore, need not be disturbed to access the twisted pair 7 talk path to establish a field communications link.

Figure 2:
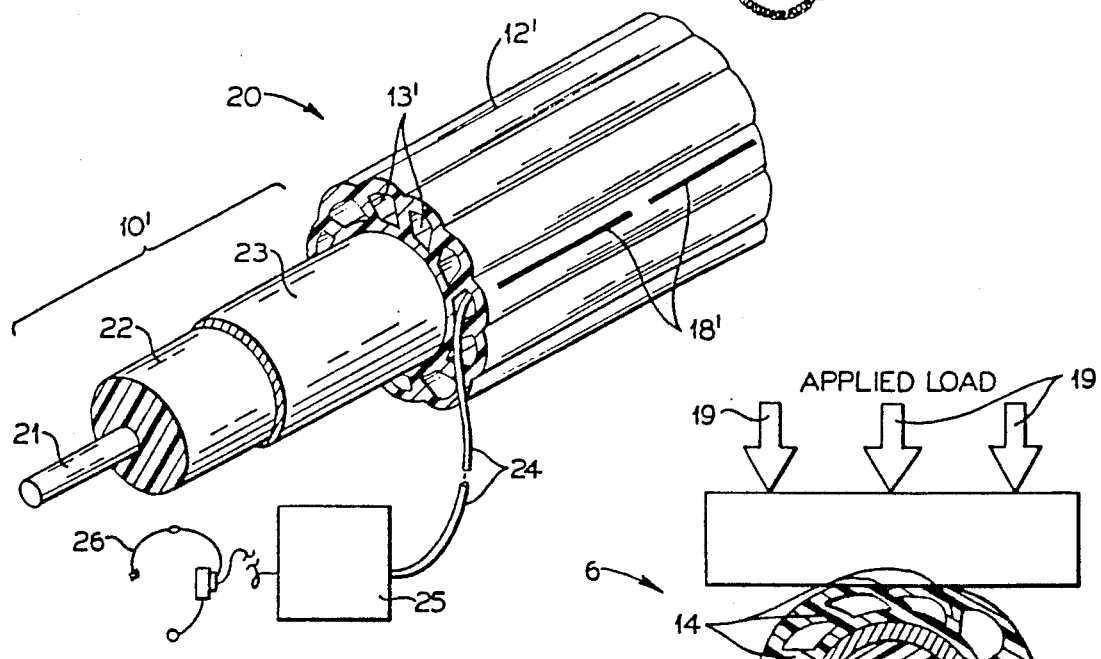
FIG. 2 is a perspective view of a cross-section of a conical cable containing an optical fiber talk path according to the present invention.

FIG. 2 is a perspective cross-section of an alternative embodiment of a coaxial cable 20 containing an optical fiber 24 talk path according to the present invention. To avoid repetition, elements in this embodiment which correspond to elements in the previous embodiment of FIG. 1 will be identified by corresponding reference numbers, with prime notation (') added. The inner axial conductor 21, insulator 22, and surrounding cylindrical conductor 23 form a core 10' which is surrounded by the cable jacket 12'. The jacket 12' may preferably be formed of a deformable material. Longitudinal cavities 13' are formed in the cable jacket 12' and a talk path, a single optical fiber 24 as illustrated, is installed in at least one of the cavities 13'. The optical fiber 24 talk path may be connected to an optical transceiver 25 and used with a hands-free headset 26 by the technician.

Referring to FIGS. 1 and 2, in a preferred embodiment, the talk path contained within a longitudinal cavity 13, 13' may be a twisted pair of copper conductors 7 or may be one or more optical fibers 24. The talk path, when used in conjunction with a field telephone 16 or optical transceiver 25, provides a readily accessible communications link for use by field technicians during cable installation, acceptance testing, and restoration. The electrical field telephone 16 may be used by the field technician from a standard telephone handset 17 or a hands-free headset 26. As would be understood by one skilled in the art, an optical transceiver 25 may be used with an optical fiber 24 talk path to provide a field communications link similar to the electrical field telephone 16.

As would be readily understood by one skilled it the art, the enhanced cable jacket 12, 12' and unique placement of the field communications link talk path may be used with other communications cable designs as well as those illustrated. For example, a high pair count copper communications cable may be made with the enhanced cable jacket and talk path of the present invention. Additionally, hybrid cables containing both optical fibers and copper conductors as the primary signal conductors may also be made according to the present invention.

Figure 3:
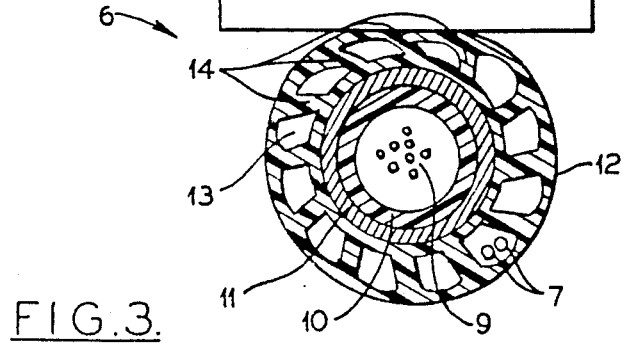
FIG. 3 is a cross-section of a cable, according to the present invention, subjected to an axially applied crushing force.

FIG. 3 illustrates the fiber optic cable 6 of FIG. 1, according to the present invention, under an applied radial load 19. The cavities 13 formed at radially spaced locations about the core 10 preferably have a non-symmetrical cross-section such that the applied radial load 19 may be substantially dissipated rather than transmitted through to the optical fibers 9 contained within the core 10. The force of the applied load 19 is dissipated by compressing the deformable walls 14 of the cavities 13 and also by rotation of the overall cable jacket 12. The cable jacket 12, therefore, proVides enhanced crush, impact, and cut-through resistance without requiring a thicker single jacket or an expensive double jacket. Moreover, the overall cable 6 may be rugged, flexible and lightweight to reduce installation costs and to increase service life.

Figure 4:
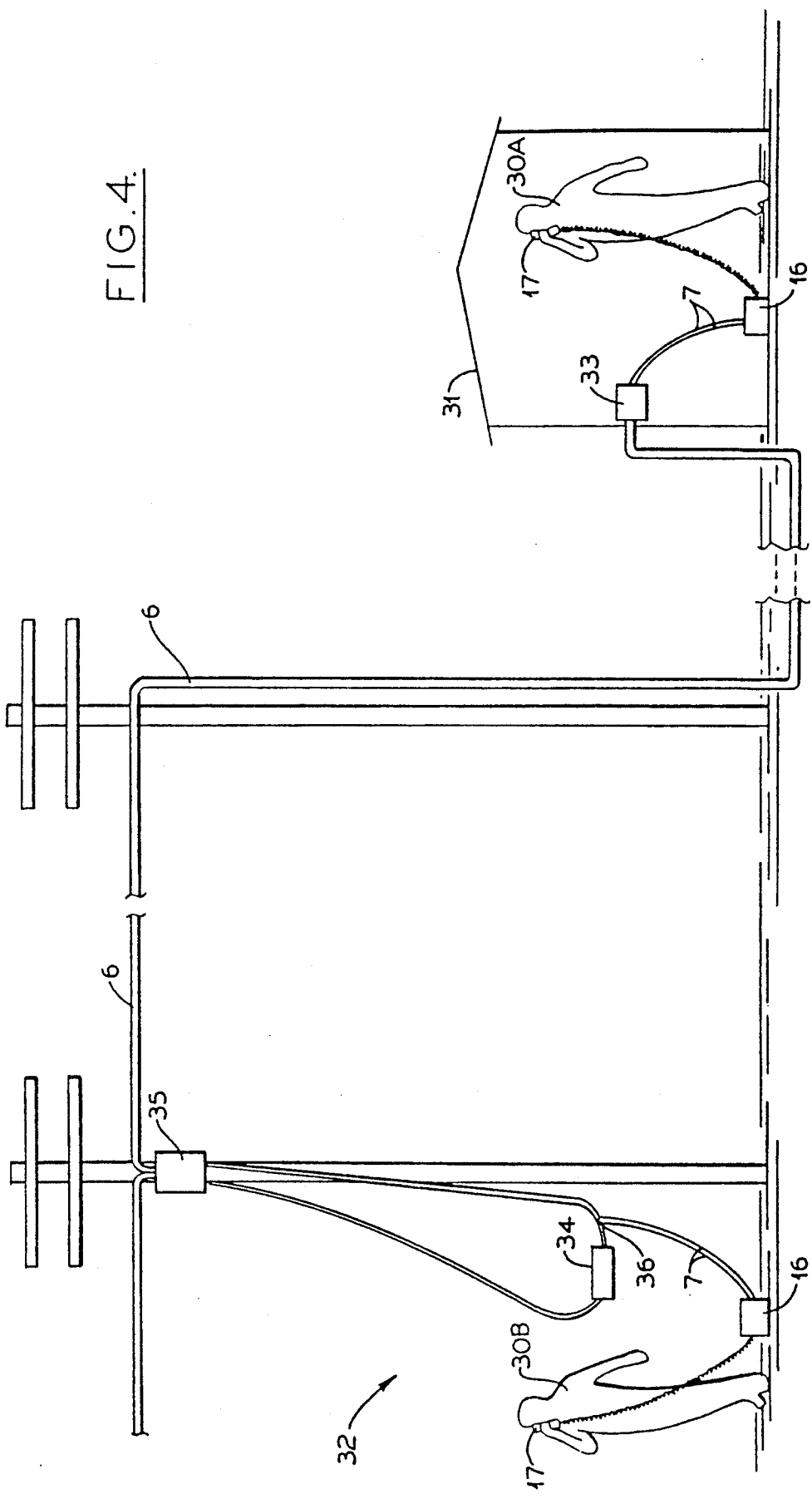
FIG. 4 is a diagrammatic view illustrating field service technicians using a field communications link according to the present invention.

FIG. 4 illustrates a field communications link being used by two field service technicians 30A, 30B on the fiber optic cable 6 of FIG. 1 according to the present invention. The fiber optic cable 6 includes both aerial and direct buried underground sections as the cable 6 may be readily used in both applications. The technician 30A at an electronics termination or repeater site 31 may communicate over the twisted pair 7 talk path to the other technician 30B at the remote site 32. The technician 30A at the equipment site 31 may connect to the talk path at a cable 6 fixed termination point 33.

Communications between the field service technicians 30A, 30B may be desirable to verify splice losses. from a just-completed cable repair, for example. The technician 30A at the equipment site 31 may measure the splice losses with an optical time domain reflectometer and inform the technician 30B at the remote site 32 of any splices that need to be remade. The technician 30B at the remote site 32 may then remake the splices and receive verification of acceptable splices before returning the splice case 34 to the splice box 35 and leaving the remote site 32. Work efficiency and work quality are thereby enhanced.

Referring to FIGS. 1 and 4, the technician 30B at the remote site 32 may sometimes need to access the twisted pair 7 talk path without disrupting the working fibers 9 of the cable 6. To do so, the technician 30B first locates the marking 18 on the jacket 12 and then cuts and removes a portion of the jacket 12 to expose the twisted pair 7 talk path. The technician 30B need only remove a small portion of the outer cable jacket 12 and need not penetrate into the core 10 of the cable 6. The technician 30B may, therefore, access the twisted pair 7 talk path even when optical fibers 9 are carrying live telecommunications traffic. As would be readily understood by one skilled in the art, additional technicians, not shown, may access the talk path 7 and communicate as in a party-line conversation.

For a copper conductor twisted pair 7 talk path, the technician 30B may scrape away some of the insulation on the conductors 7 and attach his field telephone 16 thereto. The technician 30B at the remote site 32 may then communicate, via the handset 17, with the technician 30A at the equipment site 31. As would be readily understood by those having skill in the art, a data communications link may be established in lieu of or in addition to the voice link illustrated. When finished, the technician 30B at the remote location 32 may remove his connection at the attachment point 36 on the cable 6 and reseal the jacket 13 using one of the cable jacket repair methods well known to those skilled in the art.

Many modifications and other embodiments of the invention will come to one skilled in the art having the benefit of the teachings presented in the foregoing descriptions and the associated drawings. Therefore, it is to be understood that the invention is not to be limited to the specific embodiment disclosed, and that modifications and embodiments are intended to be included within the scope of the appended claims.

That which is claimed is:

1. A communications cable comprising:

at least one longitudinally extending primary signal conductor;

a core containing said primary signal conductor;

a jacket surrounding said core, said jacket formed of a deformable material having a plurality of longitudinal cavities formed therein at radially spaced locations about said core;

a talk path in at least one of said longitudinal cavities, so as to be readily accessible for use in communication along the cable during cable service; and marking means on the outer surface of said jacket for indicating the location of said talk path relative to said jacket for assisting the field technicians in locating said talk path.

2. The communications cable of claim 1 wherein said at least one primary signal conductor comprises an electrical conductor.

3. The communications cable of claim 1 wherein said at least one primary signal conductor comprises an optical fiber.

4. The communications cable of claim 3 wherein said core comprises a buffer tube, and wherein said optical fiber is located within said buffer tube.

5. The communications cable of claim 3 wherein said core comprises a longitudinally extending strength member.

6. The communications cable of claim 1 wherein said jacket is polyethylene.

7. The communications cable of claim 1 wherein said longitudinal cavities contain air.

8. The communications cable of claim 1 wherein said longitudinal cavities contain a water blocking material.

9. The communications cable of claim 1 wherein said talk path comprises a pair of electrical conductors.

10. The communications cable of claim 1 wherein said talk path comprises an optical fiber.

11. The communications cable of claim 1 wherein said marking means comprises ink of a color contrasting to the color of said jacket.

12. The communications cable of claim 1 wherein said marking means comprises embossed outer surface areas of said jacket.

13. The communications cable of claim 1 wherein said marking means comprises an extruded stripe of a color contrasting to the color of said jacket.

14. A fiber optic cable comprising:

at least one optical fiber;

a core containing said optical fiber;

a jacket encompassing said core, said jacket formed from a deformable material having a plurality of spaced longitudinal cavities formed therein at radially spaced locations about said core;

a talk path in at least one of said longitudinal cavities, so as to be readily accessible to field technicians for use in communication along the cable during cable service; and marking means on the outer surface area of said jacket for indicating the location of said talk path relative to said jacket for assisting the field technicians in locating said talk path.

15. The fiber optic cable of claim 14 wherein said core comprises a longitudinally extending strength member.

16. The fiber optic cable of claim 14 wherein said jacket comprises polyethylene.

17. The fiber optic cable of claim 14 wherein said longitudinal cavities contain air.

18. The fiber optic cable of claim 14 wherein said longitudinal cavities contain a water blocking material.

19. The fiber optic cable of claim 14 wherein said talk path comprises a pair of electrical conductors.

20. The fiber optic cable of claim 14 wherein said talk path comprises an optical fiber.

21. The communications cable of claim 14 wherein said marking means comprises ink contrasting to the color of said jacket.

22. The communications cable of claim 14 wherein said marking means comprises embossed outer surface areas of said jacket.

23. The communications cable of claim 14 wherein said marking means comprises an extruded stripe of a color contrasting to the color of said jacket.

24. A method of making a communications cable having a talk path in the cable jacket wherein the talk path may be readily accessed by a field technician, and wherein the cable has enhanced crush, impact, and cut-through resistance, said method comprising the steps of:

forming a cable core for carrying at least one longitudinally extending primary signal conductor;

extruding a jacket of a deformable material around the core wherein the jacket contains a plurality of longitudinal cavities formed therein at radially spaced locations about the core;

said extruding step comprising placing a talk path in at least one of the longitudinal cavities; and marking the portion of the outer surface area of the cable jacket overlying the talk path to indicate the location of the talk path, so that a field service technician may readily locate the talk path.

25. The method of claim 24 further comprising the step of filling the longitudinal cavities with a water blocking material.

26. A method of forming a cable jacket around a communications cable core having a talk path in the cable jacket wherein the talk path may be readily accessed by a field technician, and wherein the cable has enhanced crush, impact, and cut-through resistance, said method comprising the steps of:

extruding a jacket of a deformable material around the core wherein the jacket contains a plurality of longitudinal cavities formed therein at radially spaced locations about the core;

said extruding step comprising placing a talk path in at least one of the longitudinal cavities; and marking the portion of the outer surface area of the cable jacket overlying the talk path to indicate the location of the talk path, so that a field service technician ma readily locate the talk path.

27. The method of claim 26 further comprising the step of filling the longitudinal cavities with a water blocking material.

28. A method of making a connection to a talk path contained within a longitudinal cavity of a jacket of a cable without disrupting a core of the cable, the talk path being for use by a field service technician during servicing of the cable, the location of the talk path being marked lengthwise along the jacket, said method comprising the steps of:

locating the lengthwise mark along the cable jacket indicating the talk path position;

cutting and removing an outer portion of the cable jacket at the mark location, thereby exposing the underlying talk path contained within the longitudinal cavity without disrupting the core of the cable; and connecting a field communications device to the talk path, to thereby establish a connection to the talk path for use by the field service technician.

* * * * *